United States Patent [19]

Bacardit

[11] Patent Number: 4,898,043
[45] Date of Patent: Feb. 6, 1990

[54] VARIABLE RATIO STEERING MECHANISM

[75] Inventor: Juan S. Bacardit, Barcelona, Spain

[73] Assignee: Bendix Espana, Barcelona, Spain

[21] Appl. No.: 253,274

[22] Filed: Oct. 4, 1988

[30] Foreign Application Priority Data

Oct. 5, 1987 [EP] European Pat. Off. ........ 87500064.8

[51] Int. Cl.⁴ .......................... B62D 5/00; F16H 35/00
[52] U.S. Cl. ........................... 74/388 PS; 74/424.8 B; 180/148
[58] Field of Search ................ 74/494, 495, 499, 486, 74/388 PS, 424.8 B; 180/79.1, 148

[56] References Cited

U.S. PATENT DOCUMENTS

| | | | |
|---|---|---|---|
| 2,860,266 | 11/1958 | Schrader | 74/424.8 B |
| 3,075,500 | 1/1963 | Mazur et al. | 74/388 PS |
| 3,085,645 | 4/1959 | Bookout et al. | 180/79.2 |
| 3,407,680 | 10/1968 | Westmoreland | 74/424.8 B |
| 3,803,927 | 4/1974 | Lawler | 74/424.8 B |
| 3,916,730 | 11/1975 | Sheppard | 74/751 |
| 4,666,014 | 5/1987 | Carlson et al. | 180/148 |

FOREIGN PATENT DOCUMENTS

| | | |
|---|---|---|
| 2363646 | 6/1974 | Fed. Rep. of Germany . |
| 59-213571 | 12/1984 | Japan . |
| 62-85760 | 4/1987 | Japan ..................... 74/499 |

Primary Examiner—Leslie A. Braun
Assistant Examiner—Janice E. Charloff
Attorney, Agent, or Firm—Larry J. Palguta; Ken C. Decker

[57] ABSTRACT

Variable ratio steering mechanism comprising a body in which is rotatably mounted an input shaft, a drive shaft having a longitudinal axis, and coupled to the input shaft so as to be rotatable therewith, an output member slidably mounted in the body, a screw mechanism connecting the drive shaft and the output member so that rotation of the drive shaft produces a corresponding displacement of the output member in the body, characterized in that the drive shaft is axially slidable with respect to the input shaft, the steering mechanism further comprising a displacement mechanism to selectively displace the drive shaft axially with respect to the input shaft, the displacement mechanism comprising a screw connection between the drive member mounted in the body.

8 Claims, 3 Drawing Sheets

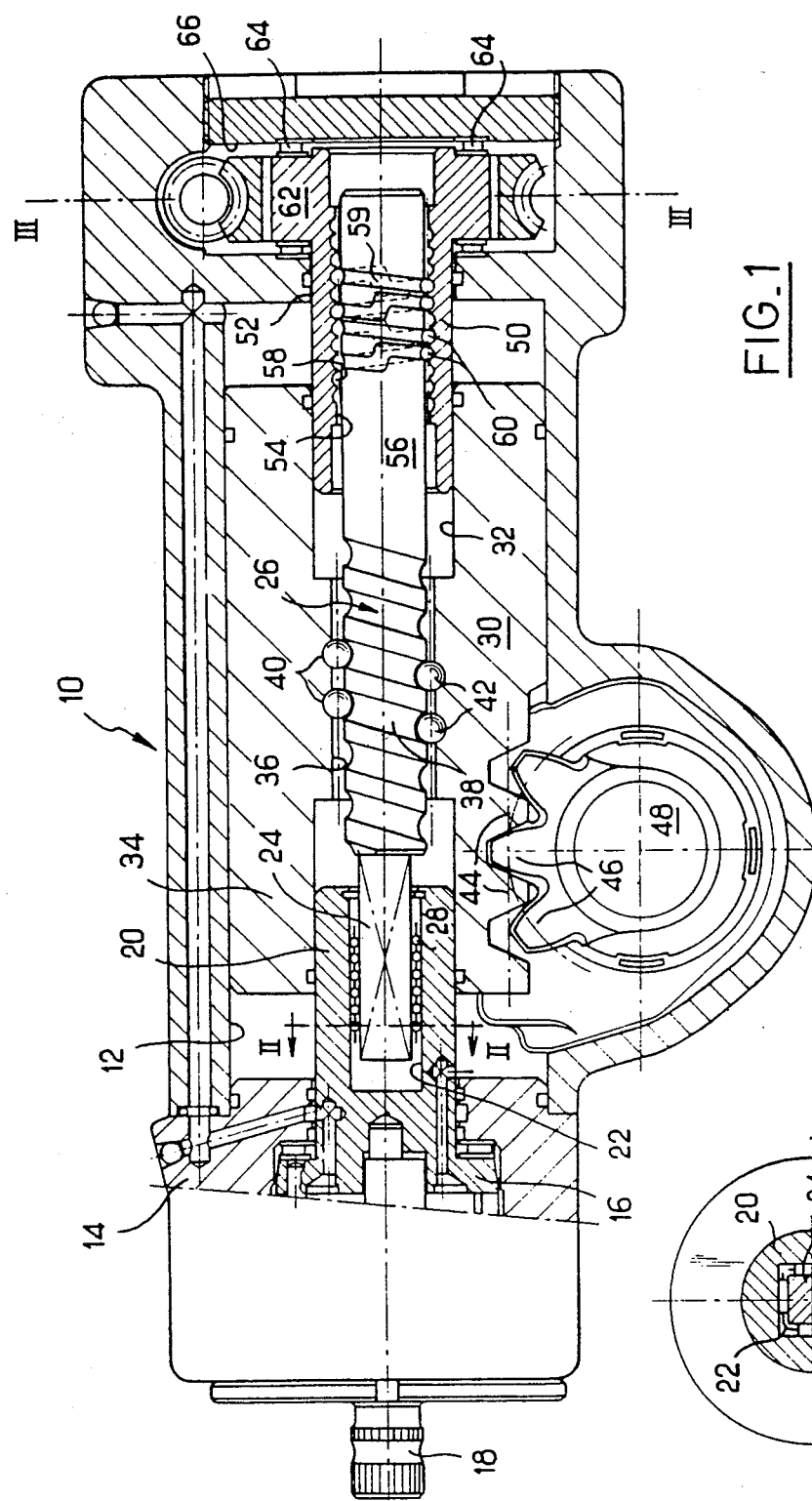
FIG_1
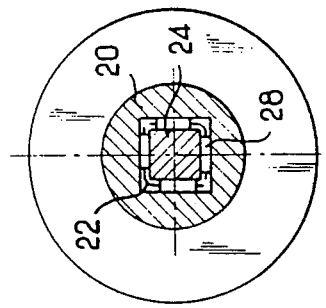
FIG_2

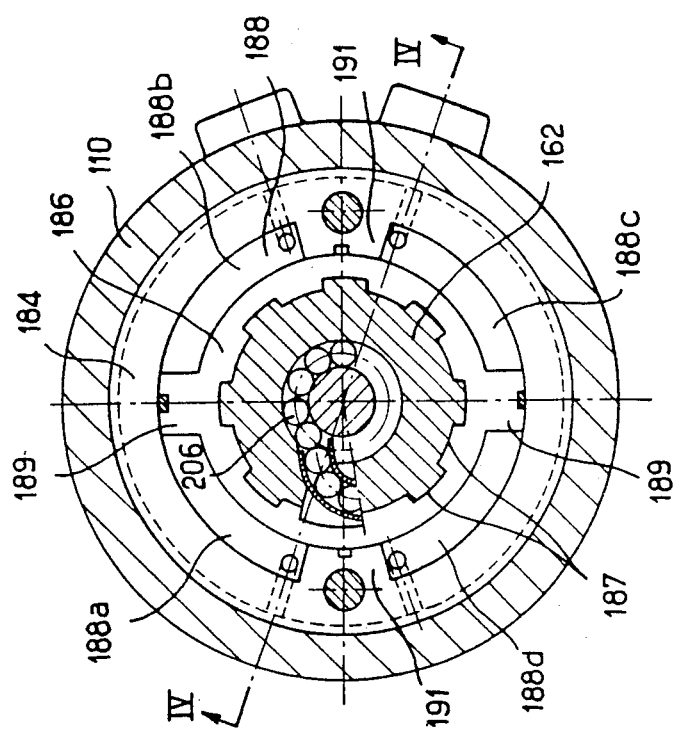
FIG_5
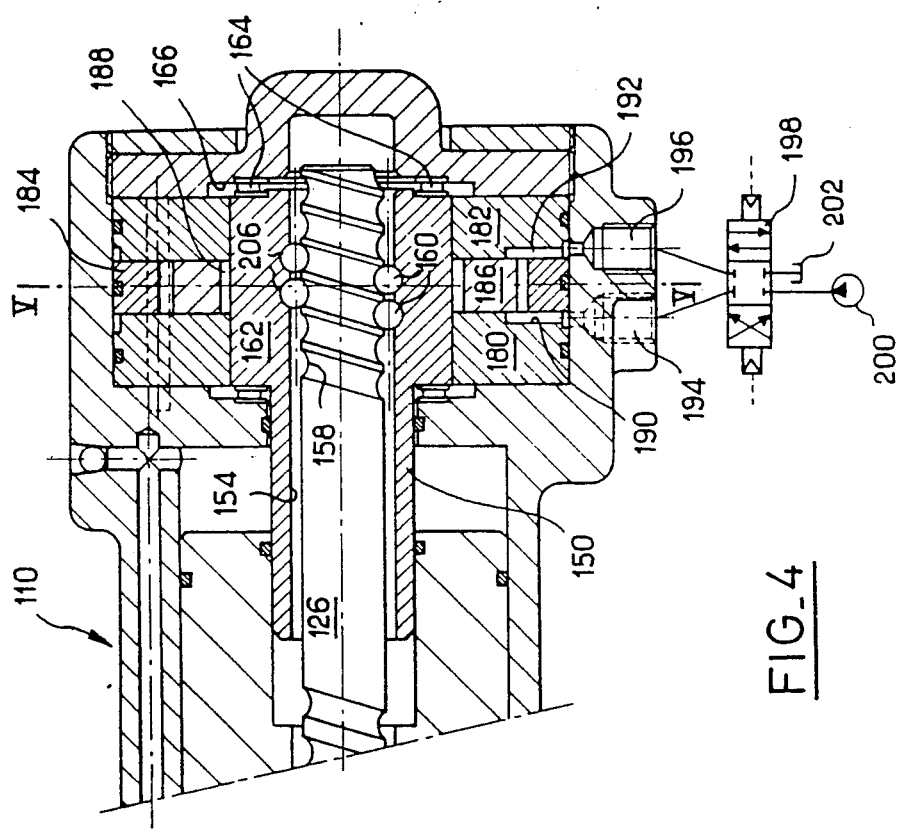
FIG_4

VARIABLE RATIO STEERING MECHANISM

The present invention relates to a variable output steering mechanism for automotive vehicles.

The steering characteristics of a vehicle may be varied in two main ways. First one may vary the reaction force at the steering wheel in accordance with one or more of the vehicle's dynamic parameters. Thus, a high degree of assistance may be provided during parking, with a low degree during high speed driving. It is also possible to vary the ratio between the angle of turn of the steering wheels and the angle of turn of the vehicle wheels.

All power steering mechanisms provide a mechanical link between the input shaft and the output shaft. The ratio between the angular movement of the input shaft and that of the output shaft determines the reduction characteristics of the steering mechanism.

Various examples of variable ratio steering mechanisms have been previously proposed. However, these devices suffered from the drawback that the change in ratio followed a fixed function which depended on the angular position of the vehicle wheels.

It is therefore desirable to have a variable ratio steering mechanism which may be adapted to the vehicle's dynamic conditions. For example, during parking a low ratio is needed in which a minimum angle of turn provides a given output angle of the wheels. Conversely, at high speed a high ratio is necessary in which a maximum angle at the steering wheel provides a given degree of turn at the wheels. Furthermore, in an emergency, when it is necessary to avoid a vehicle when travelling at speed, the steering wheel is turned rapidly through a large angle. In such circumstances it is desirable to have a low ratio mechanism to give a maximum degree of turn.

It is therefore an object of the present invention to provide a steering mechanism for a vehicle in which the reduction ratio may be varied in accordance with the dynamic conditions of the vehicle.

According to the invention there is provided a variable ratio steering mechanism comprising a body in which is rotatably mounted on an input shaft, a drive shaft having a longitudinal axis, and coupled to the input shaft so as to be rotatable therewith, an output member slideably mounted in the body, screw means connecting the drive shaft and the output member so that rotation of the drive shaft produces a corresponding displacement of the output member in the body, characterized in that the drive shaft is axially slideable with respect to the input shaft, the mechanism further comprising means to selectively displace the drive shaft axially with respect to the input shaft, the means comprising a screw connection between the drive shaft and a drive member mounted in the body.

The invention will now be described by way of example with reference to the accompanying drawings in which:

FIG. 1 is a partial longitudinal section of a variable ratio steering mechanism according to a first embodiment of the invention;

FIG. 2 is a cross-section taken along the line II—II in FIG. 1.

FIG. 4 is a longitudinal section of a part of a variable ratio steering mechanism according to a second embodiment of the invention; and FIG. 5 is a cross-section taken along the line V—V in FIG. 4.

Figure 3:
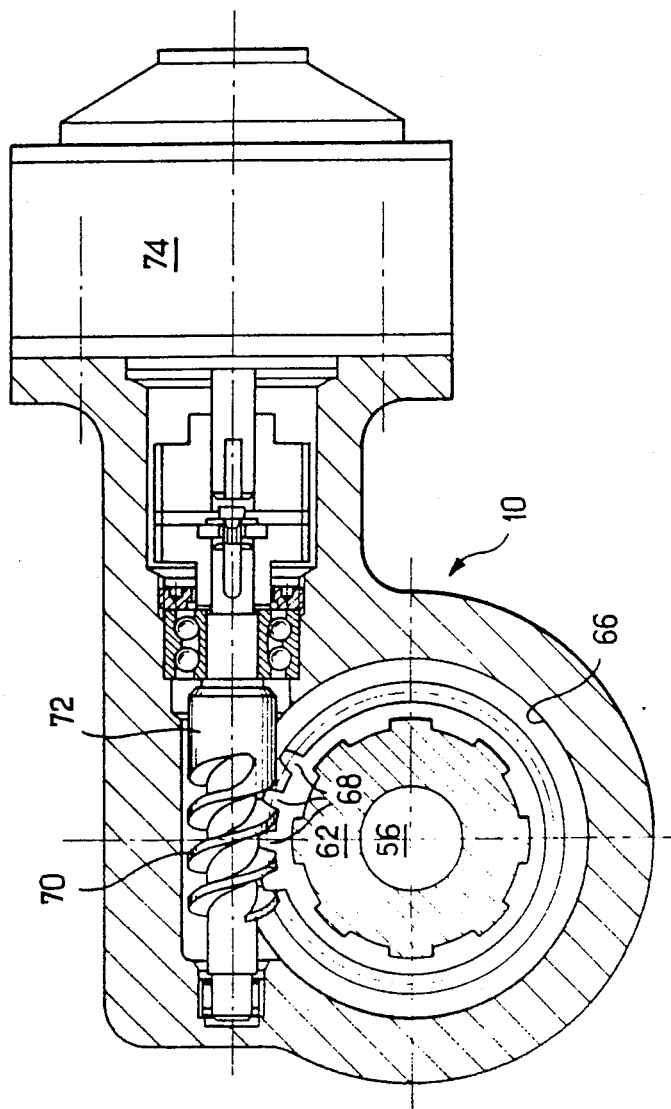
FIG. 3 is a cross-section taken along the line III—III in FIG. 1.

As shown in FIG. 1, the variable ratio steering assembly comprises a casing 10 in which is formed a longitudinal bore 12. The casing 10 is closed by a closure member 14 in which is rotatably mounted an input shaft 16 which comprises a projecting, splined portion 18 by which the input shaft 16 is intended to be connected to the steering column of a vehicle (not shown). An end 20 of the input shaft 16 projects into the bore 12 and comprises a longitudinal blind bore 22 of rectangular cross-section. (See in this respect FIG. 2). One end 24 of a drive shaft 26 is slideably mounted in the blind bore 22 by means of bearings 28. The end 24 of the drive shaft 26 has a rectangular cross-section corresponding to that of the blind bore 22 and thus the drive shaft 26 is free to slide but not rotate relative to the input shaft 16.

An output member or piston 30 is slideably and sealingly mounted in the bore 12 and comprises a longitudinal stepped bore 32, one end 34 of which receives the end 20 of the input shaft 16. A central part 36 of the stepped bore 32 receives a threaded portion 38 of the drive shaft 26 and has a corresponding internal thread 40. An arrangement of balls 42 is located between the threaded portion 38 and the internal thread 40 and serve to connect the drive shaft 26 to the output piston 30 such that rotation of the drive shaft 26 in a given direction results in the sliding of the output piston 30 in bore 12 to the left or the right when viewing the drawings. On a part of the outer surface of the output piston 30 are formed a number of gear teeth 44 which are adapted to mesh with corresponding teeth 46 formed on an output shaft 48. Thus, in a conventional manner, displacement of the output piston 30 results in a corresponding rotation of the output shaft 48 which is connected to the front wheels of the vehicle (not shown).

In accordance with the invention the steering mechanism comprises means for displacing the drive shaft 26 relative to the casing 10. A drive member or sleeve 50 is rotatably mounted in an opening 52 in the casing and projects into the bore 12. The sleeve 50 has a passage 54 extending therethrough which receives the end 56 of the drive shaft 26. The inner surface of the passage 54 has a continuous thread 58 formed therein which, in combination with a threaded region 59 on the outer surface of end 56 of the drive shaft 26 and with a series of balls 60 located between the threads, forms a coupling which ensures that rotation of the drive sleeve 50 will result in axial displacement of the drive shaft 26.

The coupling is such that, when the drive sleeve is stationary, rotation of the drive shaft 26 will produce relative lateral movement between the drive shaft 26 and the drive sleeve 50 due to the threaded connection between them. Clearly, the direction of movement of the drive shaft 26 will depend on its sense of rotation.

The drive sleeve 50 comprises an enlarged head 62 which is rotatably mounted by way of bearings 64 in a cavity 66 formed in the casing 10. As shown in FIG. 3 the circumference of the head 62 of drive sleeve 50 is formed with teeth 68 which mesh with a screw thread 70 formed on a motor shaft 72 which is rotatably mounted in the casing 10. The motor shaft 72 is connected to an electric motor 74 which may be selectively actuated so as to turn the motor shaft 72 in either desired direction. Due to the meshing of the screw thread 70 with teeth 68 to form a worm gear, rotation of the motor shaft 72 results in a corresponding rotation of the drive sleeve 50. As previously described, rotation of the drive sleeve 50 by the motor 74 will result in an axial displacement of drive shaft 26 due to the threaded coupling between the drive sleeve 50 and the drive shaft 26.

As the drive shaft 26 is connected to the output piston 30 by the arrangement of balls 42, axial displacement of the drive shaft 26 will produce a corresponding axial displacement of the output piston 30 in bore 12 leading to a given rotation of output shaft 48. The movement of the drive shaft 26 by the drive sleeve 50 is independent of, and in no way inhibits, the rotation of the drive shaft 26 by the input shaft 16. The rotation of the input shaft 16 causes a relative movement between the output piston 30 and the drive shaft 26, the drive shaft 26 being impeded from moving axially by the threaded connection with the drive sleeve 50. Conversely rotation of the drive sleeve 50 causes a relative movement between the drive shaft 26 and the casing 10, with an associated movement of the output piston. Thus, by selectively actuating the motor 74 it is possible to modify the movement of the output piston 30, either increasing or decreasing the movement of the output shaft for a given movement of the input shaft 16. It should be noted that the movement of the output piston 30 as a result of rotation of the input shaft 26 is, when the drive sleeve is stationary, a function of the summation of the pitches of the two threads 38 and 59 on the input shaft 26.

The reduction ratio depends on the relative handedness of the screw threads 38 and 59.

FIG. 4 and 5 show a second embodiment of variable output steering mechanism which differs from the first in the type of motor used to drive the drive sleeve. In this embodiment, the drive sleeve 150 has a head 162 of only slightly increased diameter which is rotatably mounted by way of bearings 164 in a cavity 166 formed in the casing 110. Three annular elements 180,182,184 are fixedly and sealingly mounted in the cavity 166 and together with a drive element 186 define a hydraulic motor chamber 188.

The drive element 186 is fixedly mounted on the head 162 of the drive sleeve 150 by means of inter-meshing crenellations 187 and comprises two vanes 189 which are arranged at 180° one to the other and project into the motor chamber 188. Annular element 184 comprises two internal projections 191 which sealingly engage drive element 186 and, together with vanes 189 divide the motor chamber 188 into four sub-chambers 188 a, b, c and d. The motor chamber 188 communicates by passages 190 and 192 with two threaded input/output connections 194 and 196 which are selectively connectable by way of a spool valve 198 to a source of high pressure hydraulic fluid 200 and a reservoir 202. By actuating the spool valve 198 high pressure fluid may be sent to either connection 194 or 196. High pressure fluid flowing in a given direction through the motor chamber 188 will act on the vanes 189 and produce a corresponding rotation of the drive sleeve 150.

The drive sleeve 150 comprises a passage 154 formed with an internal thread 206 which, together with a continuous thread 158 formed on the end 156 of the drive shaft 126 forms a recirculating passage for a series of balls 160. This recirculating ball arrangement forms a coupling between the drive sleeve 150 and the drive shaft 126 which ensures that a rotation, in a given direction, of the drive sleeve 150 will produce a corresponding axial displacement of the drive shaft 126.

It is envisaged that a variable ratio steering mechanism according to the present invention may be combined with a device which modulates the reaction force as discussed above. Such a combination would tend to give optimum driving feeling to the vehicle driver. The electric motor 74 and the spool valve 198 will be actuated, when the vehicle is in use, by an electronic control circuit which receives inputs relating to vehicle speed, lateral acceleration, load, centre of gravity and steering wheel spinning speed. It is further envisaged that the input shaft 16 and the output piston 30 both be fitted with a position transducer to be linked to the electronic control circuit for the mechanism. It is further envisaged that the coupling between the input shaft and the drive shaft be arranged so that the input shaft is received inside the drive shaft.

I claim:

1. A variable ratio steering mechanism comprising a body in which is rotatably mounted an input shaft, a drive shaft having a longitudinal axis and coupled to the input shaft so as to be rotatable therewith, an output member slidably mounted in the body, screw means connecting the drive shaft and the output member so that rotation of the drive shaft produces a corresponding displacement of the output member in the body, characterized in that the drive shaft is axially slidable with respect to the input shaft, the mechanism further comprising means to selectively displace the drive shaft axially with respect to the input shaft, the displacement means comprising screw connection means between a drive member mounted in the body and the drive shaft.

2. The steering mechanism as claimed in claim 1, characterized in that the drive member is selectively rotatable in the body so as to displace axially the drive shaft.

3. The steering mechanism as claimed in claim 1, characterized in that the drive member comprises a sleeve with an internal threaded surface, an end of the drive shaft being received within the sleeve and having an external threaded surface which cooperates with the internal threaded surface of the sleeve.

4. The steering mechanism as claimed in claim 3, characterized in that the screw connection means further comprises an arrangement of balls between the threaded surfaces.

5. The steering mechanism as claimed in claim 4, characterized in that a motor is coupled to the drive member by means of a worm gear.

6. The steering mechanism as claimed in claim 4, characterized in that a hydraulic motor is coupled to the drive member and selectively connectable to a source of high pressure fluid.

7. The steering mechanism as claimed in claim 2, characterized in that the input shaft comprises an opening of polygonal cross-section which slidably receives an end of the drive shaft, said end having a corresponding polygonal cross-section so as to form the rotatable coupling with the input shaft.

8. The steering mechanism as claimed in claim 7, characterized in that the output member is operably connected to an output shaft whereby displacement of the output member causes rotation of the output shaft.

* * * * *